United States Patent [19]

Briggs

[11] 4,450,791
[45] May 29, 1984

[54] FEED TUB

[76] Inventor: Douglas V. Briggs, Jenness Pond Rd. East, Northwood, N.H. 03261

[21] Appl. No.: 505,194

[22] Filed: Jun. 17, 1983

Related U.S. Application Data

[63] Continuation-in-part of Ser. No. 331,170, Dec. 16, 1981, abandoned.

[51] Int. Cl.³ .............................................. A01K 5/01
[52] U.S. Cl. ..................................................... 119/61
[58] Field of Search ..................................... 119/61, 63

[56] References Cited

U.S. PATENT DOCUMENTS

| | | | |
|---|---|---|---|
| 892,071 | 6/1908 | McArthur | 119/61 |
| 998,973 | 7/1911 | McCollough | 119/61 |
| 1,737,797 | 12/1929 | Jacot | 119/61 |
| 4,253,424 | 3/1981 | Williams | 119/61 |

FOREIGN PATENT DOCUMENTS 2448853 10/1980 France .................................. 119/61

*Primary Examiner*—Hugh R. Chamblee
*Attorney, Agent, or Firm*—F. R. Agovino

[57] ABSTRACT

An animal feed tub having a stackable lower portion which fits within a stackable upper portion is disclosed. The upper portion of the tub is a container having four sides and a top with an upper feed opening therein. The lower portion of the tub has four sides and a bottom which define a lower feed opening with a ridge. The feed openings, defined by a ridge, function as an antispill device. The edges of the upper and lower portions interlock and form a fill opening which opposes the feed opening. The tub is made of fiberglas which is gelcoated. The tub is rotatable about a rod so that feed within the tub may flow out of the fill opening.

7 Claims, 3 Drawing Figures

FEED TUB

This is a continuation-in-part of application Ser. No. 331,170 filed Dec. 16, 1981, now abandoned.

BACKGROUND OF THE INVENTION

1. Field of the Invention

The invention generally relates to animal feed tubs and, in particular, to an animal feed tub having a stackable top portion and a stackable bottom portion which, when inverted, fits within the top portion.

2. Discription of the Prior Art

Feed tubs are well known in the prior art. For example, U.S. Pat. No. 4,180,014 issued to Mathews describes an upwardly opening feeding trough at the lower end of a storage hopper. U.S. Pat. No. 4,247,004 issued to Bird teaches that stackable containers are well known in the prior art. Other types of feed tubs which are known in the prior art are described in U.S. Pat. Nos. 939,533 to Myers, 2,933,063 to Geerlings, 3,683,861 to Bauspies, and 4,029,051 to McKinney.

SUMMARY OF THE INVENTION

It is an object of this invention to provide a feed tub which has a stackable bottom portion.

It is another object of this invention to provide a feed tub which has a stackable top portion.

It is yet another object of this invention to provide a feed tub which has a top portion which, when inverted, fits within a bottom portion.

It is still another object of this invention to provide a feed tub with an anti-spill means.

It is another object of this invention to provide a rotatable feed tub with opposing feed and fill openings.

The tub comprises a lower portion having four walls and a bottom which, when inverted, fits within an upper portion having four walls and a bottom. The walls form interlocking edges defining a fill opening and each portion is stackable. The portions have a feed opening which defines an anti-spill means. Means for rotating the tub may be provided so that feed within the tub may flow out of the fill opening.

DESCRIPTION OF THE PREFERRED EMBODIMENT

Figure 1:
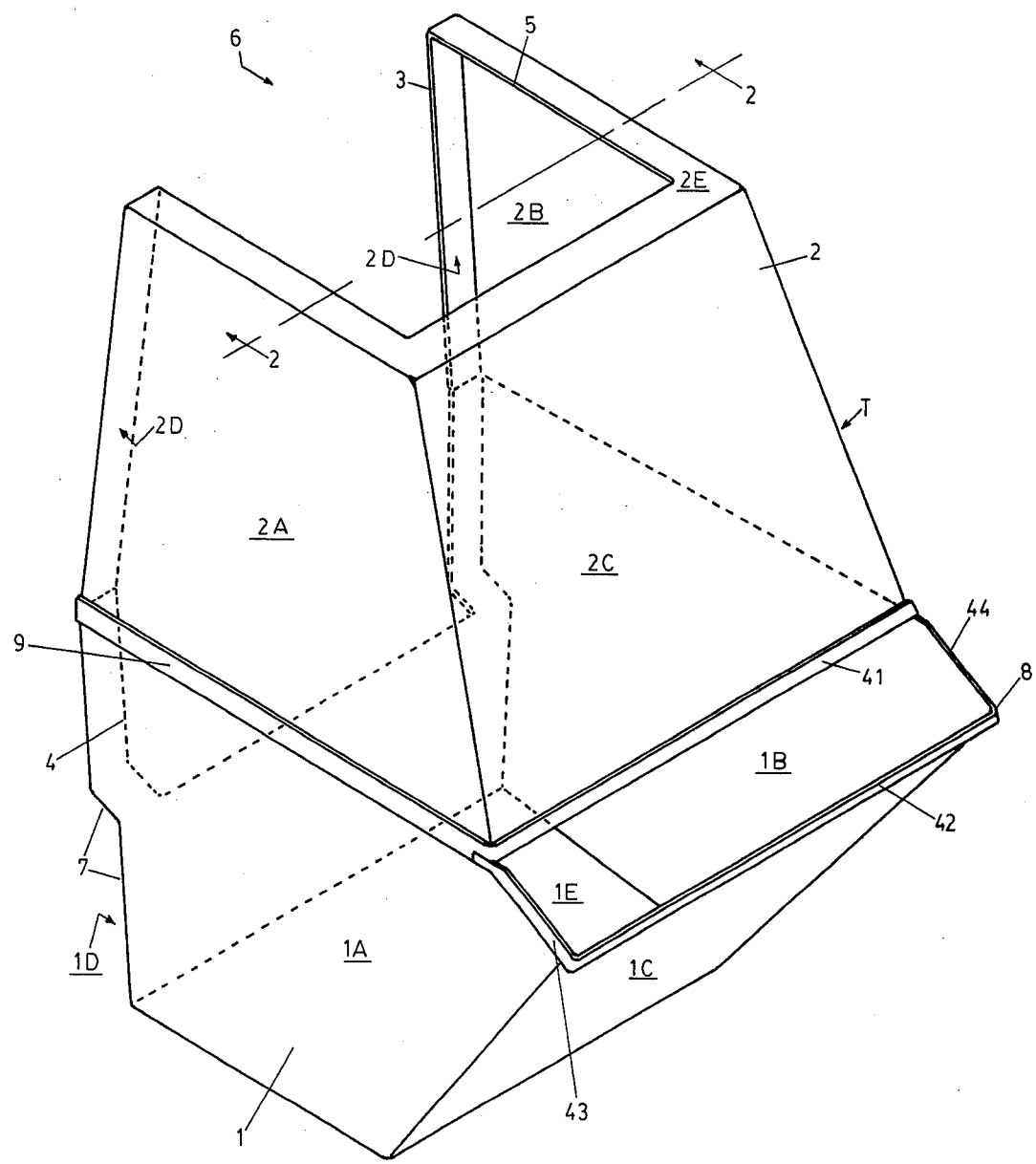
FIG. 1 is a perspective view of a feed tub according to the invention with the top portion interlocked to the bottom portion.

The animal feed tub T according to the invention comprises a lower container portion 1 engaging an upper container portion 2. The lower portion 1 has four joined sides: left side 1A, right side 1B, fill (front) side 1C and feed (rear) side 1D. Left side 1A and right side 1B are parallel sides which are substantially perpendicular to bottom portion 1E. Feed side 1D is provided with a cutout portion 7 and an opening which defines the lower feed opening 4. Fill side 1C is outwardly tapered forming an oblique angle with bottom 1E.

Upper portion 2 has four joined sides: left side 2A, right side 2B, fill (front) side 2C and feed (rear) side 2D. Left side 2A and right side 2B are substantially perpendicular to top side 2E and parallel to each other. Fill side 2C is outwardly tapered from top side 2E and its lower edge 41 forms one side of access opening 8. The other sides of access opening 8 are formed by upper edge 42 of fill side 1C, the portion of edge 43 which is adjacent to fill side 1C and the portion of edge 44 which is adjacent to fill side 1C. Feed side 2D has an opening 3 and top side 2E has an opening 5 which define the upper feed opening 6. The lower feed opening 4 and the upper feed opening 6 together form the feed opening. Specifically, opening 4 is contiguous to opening 3 which is contiguous to opening 5 which together form a single feed opening. The bottom edges of the sides 2A, 2B and 2D of upper portion 2 form an interlocking portion 9 which engages the upper edges formed by sides 1A, 1B and 1D of lower portion 1.

Figure 2:
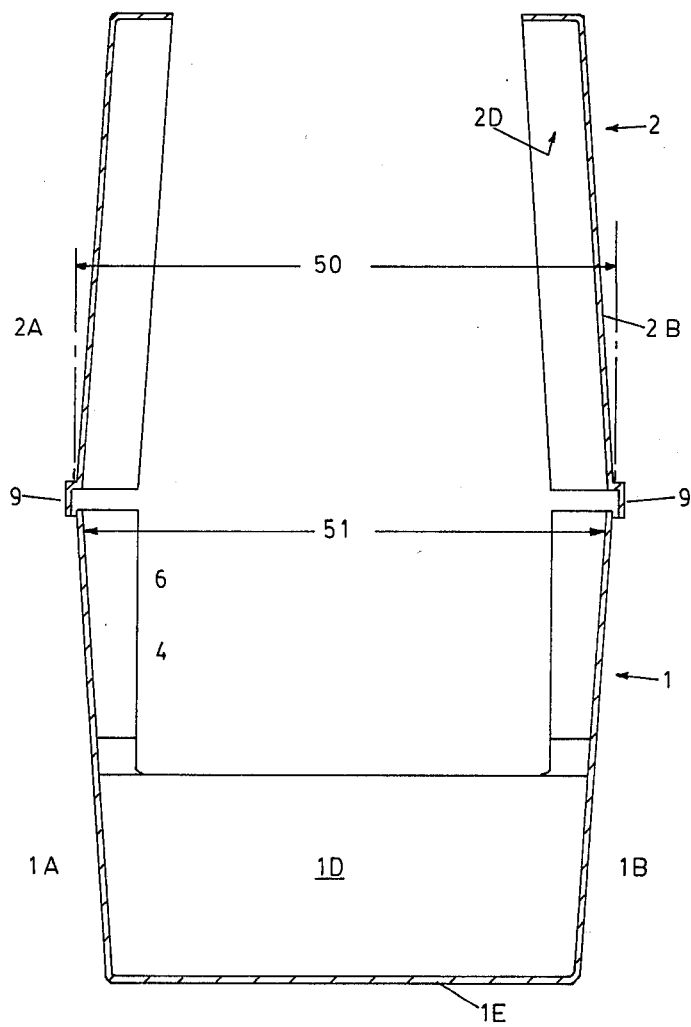
FIG. 2 is a sectional view of the feed tub according to the invention taken along lines 2—2 of FIG. 1.

Lower portion 1 is stackable with other lower portions due to its configuration. Similiarly, upper portion 2 is stackable with other upper portions of similiar configuration. In addition, upper portion 2, when inverted, fits within lower portion 1 as illustrated in FIG. 2. In particular, the outermost width 50 of upper portion 2 is less than the innermost width 51 of lower portion 1. As a result, the feed tubs according to the invention are comprised of two halves, upper and lower, which permit the feed tubs to be shipped or stored in multiple stacks thereby minimizing shipping and storage costs.

Figure 3:
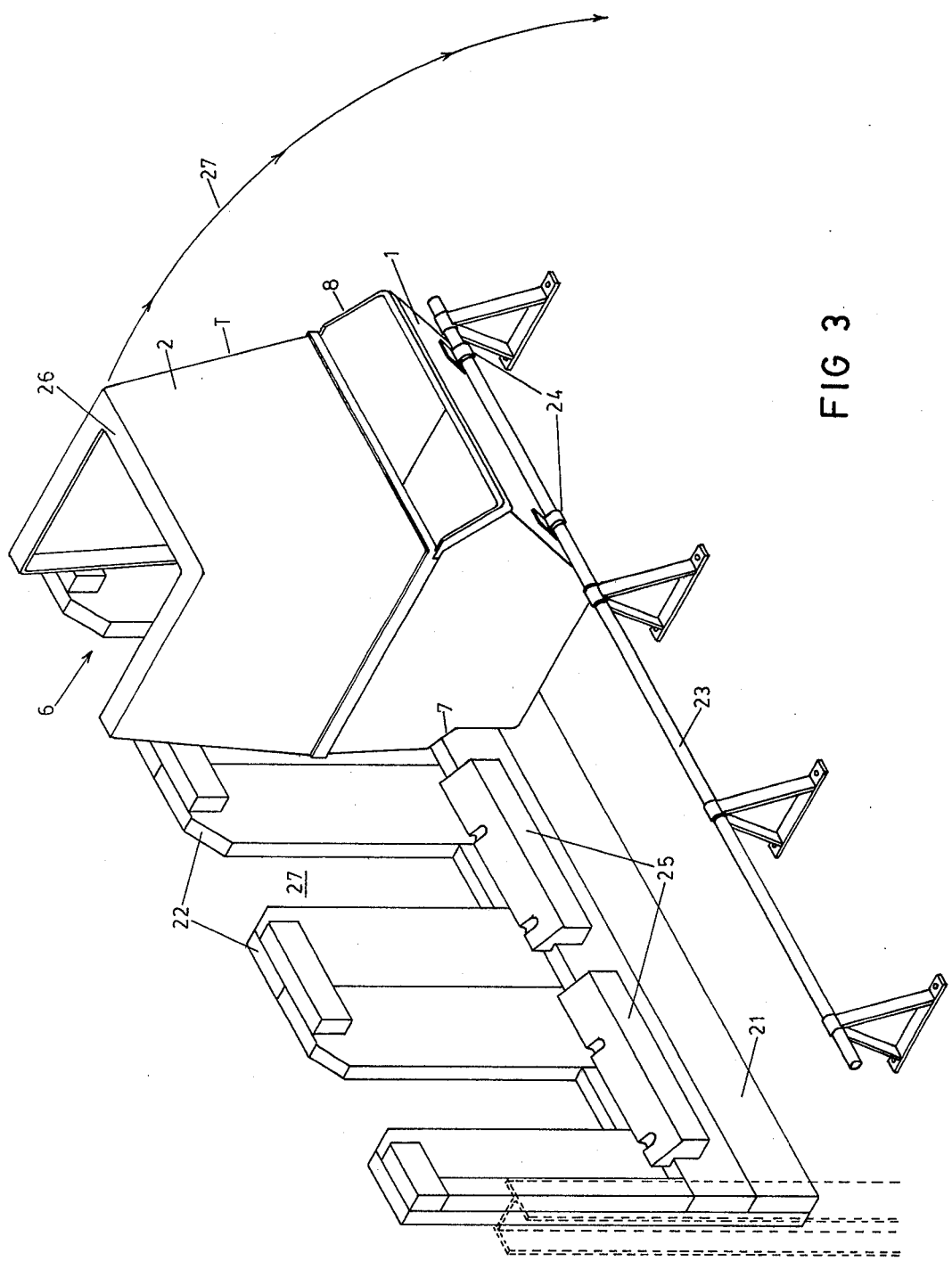
FIG. 3 is a perspective view of the feed tub according to the invention rotatably mounted adjacent a tombstone fence through which animals may feed.

In use, the two halves may be fitted together so that the interlocking portion 9 of upper portion 2 engages the edges of lower portion 1. The tub T may then be mounted on a supporting structure such as a steel pivoting rail 23 as shown in FIG. 3.

Tombstone fence 21 has slats 22 between which are spaces 27 which provide an animal with access to tub T. The tub T is supported by a pivot rod 23 which is engaged by saddle clamps 24 affixed to side 1C. The tombstone fence may be provided with resting block 25 which engages cutout portion 7. To fill the tub T, feed is dumped into the tub through access opening 8. An animal may approach the tub T between slats 22 and can eat feed within the tub T through the feed opening. The feed opening formed by lower feed opening 4 and upper feed opening 6 prevents a feeding animal from spilling feed out of the tub T or from accessing an adjacent tub. To empty tub T, upper portion 2 is grasped at point 26 and pulled in the direction of arrows 27 causing tub T to rotate about pivot rod 23. Feed within the tub T flows out access opening 8 and into a dust pan or other receptacle placed below opening 8. Thus, the tub T may be quickly and easily emptied to determine the amount of consumed feed or for refilling with a different feed.

Each portion of the feed tub is constructed of fiberglas which provides maximum strength, durability and longevity. The interior of the tub is treated with a gel-coat 10 that creates a smooth surface to permit ease of cleaning. In addition, the gel-coating treatment reduces the possibility of contamination between feeding trials if special chemicals or additives have been in use. Furthermore, gel-coated fiberglas is particularly useful and susceptible to high pressure cleaning.

The tub according to the invention serves as a divider between adjacent animals in that the total height from the floor level of the animal to the top of the feed tub divides feeding animals. The feed tubs are designed in such a way as to prevent the animal from spilling feed out of the tub T.

What is claimed is:

1. An animal feed tub adapted for use in combination with a tombstone fence and a pivot bar associated with the fence, said feed comprising:

A. a lower container portion having
   (i) a front wall having means for engaging the pivot bar,
   (ii) opposing side walls,
   (iii) a rear wall having means for engaging the tombstone fence,
   (iv) and a bottom;
B. an upper container portion having
   (i) a front wall,
   (ii) opposing side walls,
   (iii) a rear wall,
   (iv) and a top;
C. the front and side walls of the top portion forming a bottom edge which interlocks with a top edge of the front and side walls of the bottom portion;
D. the upper portion being sized to fit within the bottom portion when disassembled from the bottom portion and inverted;
E. the front wall of the lower container portion being tappered outwardly such that the upper edge of the front wall of the lower container portion, the portions of the upper edge of the side walls of the lower container portion adjacent to the front wall and the lower edge of the front wall of the upper container portion for an access opening; and
F. the upper part of the rear wall of the lower container portion having an opening which is contiguous to an opening in the rear wall of the upper container portion which is contiguous to an opening in the top of the upper container portion, said openings forming a single feed opening whereby an animal may feed through the feed opening, spillage of feed in the tub by a feeding animal is minimized, the tube may be filled with feed through the access opening and the tub may be rotated about the pivot bar away from the tombstone fence to dispense feed in the tub through the access opening.

2. The feed tub of claim 1 wherein said means for engaging the tombstone fence comprises a cutout portion in the lower container portion for engaging a resting block of the tombstone fence.

3. The feed tub of claim 1 wherein said bottom container portion is stackable with other bottom container portions of the same configuration.

4. The feed tub of claim 3 wherein said top container portion is stackable with other top container portions of the same configuration.

5. The feed tub of claim 4 wherein said lower container portion and said upper container portion comprise fiberglas.

6. The feed tub of claim 5 wherein said fiberglas is gel-coated.

7. The tub of claim 1 wherein the front wall of the lower container portion forms an oblique angle with the bottom of the lower container portion and said means for engaging the pivot bar comprises a clamp for rotatably interconnecting the front wall of the lower container portion and the pivot bar.

* * * * *